UNITED STATES PATENT OFFICE.

ALFRED B. ELY, OF NEWTON, MASSACHUSETTS.

IMPROVED MATERIAL FOR CARTRIDGE-CASES.

Specification forming part of Letters Patent No. 88,948, dated April 13, 1869.

*To all whom it may concern:*

Be it known that I, ALFRED B. ELY, of Newton, in the State of Massachusetts, have invented a new and Improved Cartridge-Case, of which the following is a full description:

I am aware that cartridge-cases have been made of paper, cloth, or texture treated with nitric and sulphuric acid, and then treated with chlorate or nitrate of potash, and that a texture has been woven from gun-cotton, and that these have been coated over with collodion; also, that cases have been made of other material, and coated with a film of collodion; and, also, that attempts have been made to make them of collodion, or dissolved gun-cotton, by dipping a mandrel into the collodion, and allowing it to harden upon the surface.

It has been found impracticable to make a cartridge-case from collodion of sufficient firmness, strength, and hardness for the purposes required (owing, perhaps, mainly to the shrinkage of the material in evaporation) by any of the processes heretofore employed.

My improvement consists in making a cartridge-case from what may be termed "prepared pyroxyline," and its compounds, when in a plastic condition, so as to be molded into shape by pressure, and left to harden by evaporation, with or without heat.

By pyroxyline I intend any cotton or other fibrous vegetable substance treated or digested with nitric, or nitric and sulphuric acids, and afterward dissolved, or partially dissolved, or reduced to a pasty condition, in any of its well-known solvents.

To render it more easily manageable, and to modify and control its shrinkage, it should be mixed or compounded with other harmonious substances, as waxes and oils combined or separately, and by themselves, or in combination with gums or resins. Other materials may be used to give body and color, as minerals or metals.

The materials should be thoroughly mixed, the pyroxyline predominating where used in composition, and then, while in the pasty, or plastic, or pliant condition, molded or formed into the requisite shape.

It may be used in a condition soft enough to pour into the mold, or it may be used in sheets, and brought into form by dies. When hard, it can be at any time softened by being immersed a short time in a solvent, so as to be easily manipulated.

It may be necessary sometimes to make the core of the mold of such material that it can be disintegrated or melted out.

Cartridge-cases can be made in this manner by a proper compounding of the materials, so that they will consume in the gun, or so that they can be driven out with the charge, or be driven out by the succeeding charge, or be ejected in the manner of metallic cases, or those made of rubber.

A very good formula will be, pyroxyline, twenty to twenty-four parts; wax or an equivalent, five to seven parts; and mineral, three to five parts, thoroughly comminuted and mixed, and made plastic or pliant with suitable solvents.

Where less strength and tenacity are required, the proportion of pyroxyline may be reduced, and those of the other ingredients increased, the main feature of the improvement being the reduction of the substance to a plastic or pliant state, so as to be readily controllable for the purposes, and so as to be formed into the requisite shape, and to acquire suitable hardness and toughness in drying.

What I claim is—

1. The use of pyroxyline and its compounds, substantially as described, in the manufacture of cartridge-cases.

2. As articles of manufacture, cartridge-cases made of pyroxyline and its compounds, substantially as described.

In testimony whereof I have hereunto subscribed my name.

ALFRED B. ELY.

Witnesses:
THOMAS C. CONNOLLY,
CHAS. B. PARKHURST.